US011050927B2

(12) United States Patent
Singh et al.

(10) Patent No.: US 11,050,927 B2
(45) Date of Patent: Jun. 29, 2021

(54) TEMPORAL INFORMATION SYNCHRONIZATION OF IMAGING DEVICES

(71) Applicant: GoPro, Inc., San Mateo, CA (US)

(72) Inventors: Priyanka Singh, San Jose, CA (US); Nicholas Ryan Gilmour, San Jose, CA (US); Naveen Chinya Krishnamurthy, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/787,299

(22) Filed: Feb. 11, 2020

(65) Prior Publication Data

US 2020/0267315 A1 Aug. 20, 2020

Related U.S. Application Data

(60) Provisional application No. 62/805,522, filed on Feb. 14, 2019.

(51) Int. Cl.
| | | |
|---|---|---|
| *H04N 5/225* | (2006.01) | |
| *H04N 5/232* | (2006.01) | |
| *H02J 7/00* | (2006.01) | |
| *H04L 29/08* | (2006.01) | |

(52) U.S. Cl.
CPC ....... *H04N 5/23227* (2018.08); *H02J 7/0063* (2013.01); *H04N 5/23216* (2013.01); *H04N 5/23241* (2013.01); *H04L 67/141* (2013.01)

(58) Field of Classification Search
CPC .......... H04N 5/23227; H04N 5/23216; H04N 5/23241; H02J 7/0063; H04L 67/141
USPC ..................................................... 348/207.11
See application file for complete search history.

(56) References Cited

U.S. PATENT DOCUMENTS

| | | | |
|---|---|---|---|
| 2008/0126420 A1* | 5/2008 | Wright ................. | H04N 21/845 |
| 2016/0094847 A1* | 3/2016 | Ibrahim ............... | H04N 19/197 |
| | | | 375/240.02 |
| 2018/0144479 A1* | 5/2018 | Nakasu ............... | G06F 16/5866 |

* cited by examiner

*Primary Examiner* — Usman A Khan
(74) *Attorney, Agent, or Firm* — Young Basile Hanlon & MacFarlane, P.C.

(57) ABSTRACT

A method, system, and non-transitory computer-readable storage medium for temporal information synchronization of imaging devices are disclosed. The method comprises capturing media using an imaging device, generating a sequence identifier for each of the media, generating a timestamp for each of the media, determining that at least one of the media includes an unknown time tag, receiving an input including temporal information, determining a time offset between each timestamp and the temporal information, and updating the timestamp for each of the media that includes an unknown time tag using the time offset to provide an updated timestamp.

20 Claims, 9 Drawing Sheets

TEMPORAL INFORMATION SYNCHRONIZATION OF IMAGING DEVICES

CROSS-REFERENCE TO RELATED APPLICATION(S)

This application claims priority to and the benefit of U.S. Provisional Application No. 62/805,522, filed Feb. 14, 2019, the entire disclosure of which is hereby incorporated by reference in its entirety.

TECHNICAL FIELD

The present disclosure relates generally to imaging devices, and, more particularly, to temporal information synchronization of imaging devices.

BACKGROUND

Imaging devices capture media, such as images and videos, and can use an internal clock (e.g., a real time clock (RTC)) to provide temporal information (e.g., date and time information) associated with each captured media. However, the temporal information can be inaccurate for a variety of reasons, including but not limited to not maintaining a correct sequence associated with the captured media or a failure to reset or assign accurate date and time settings. These issues can cause inaccurate temporal information to be associated with the captured media, which leads to user frustration during operation of the imaging devices.

SUMMARY

The present disclosure discloses implementations of temporal information synchronization of imaging devices.

In a first aspect, a method is disclosed that comprises capturing media using an imaging device, generating a sequence identifier for each of the media, generating a timestamp associated with the sequence identifier for each of the media, determining that at least one of the media includes an unknown time tag, receiving an input including temporal information, determining a time offset between each timestamp and the temporal information, and updating the timestamp for each of the media that includes an unknown time tag using the time offset to provide an updated timestamp.

In a second aspect, a system is disclosed that comprises a processor and a memory that includes at least one of a persistent memory, non-volatile memory, or a combination thereof, and that also includes instructions that, when executed, cause the processor to: capture media, generate a timestamp for each of the media, determine that at least one of the media includes an unknown time tag, receive an input including temporal information, determine a time offset between each timestamp and the temporal information, and update the timestamp for each of the media that includes an unknown time tag using the time offset to provide an updated timestamp.

In a third aspect, a non-transitory computer-readable storage medium is disclosed that includes instructions that, when executed, cause at least one processor to: capture media using an imaging device; generate an identifier for each of the media, each identifier including a sequentially ordered code; generate a timestamp associated with the identifier for each of the media; detect battery discharge information associated with the imaging device; determine that at least one of the media includes an unknown time tag using the battery discharge information; receive an input including temporal information; determine a time offset between each timestamp and the temporal information; and update the timestamp corresponding to each of the at least one of the media using the time offset to provide an updated timestamp.

These and other aspects of the present disclosure are disclosed in the following detailed description of embodiments, the appended claims, and the accompanying drawings.

BRIEF DESCRIPTION OF THE DRAWINGS

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or embodiment; other implementations and embodiments are possible by way of interchange of or combination with some or all of the described or illustrated elements. Wherever convenient, the same reference numbers will be used throughout the drawings to refer to same or like parts.

DETAILED DESCRIPTION

Figure 1:
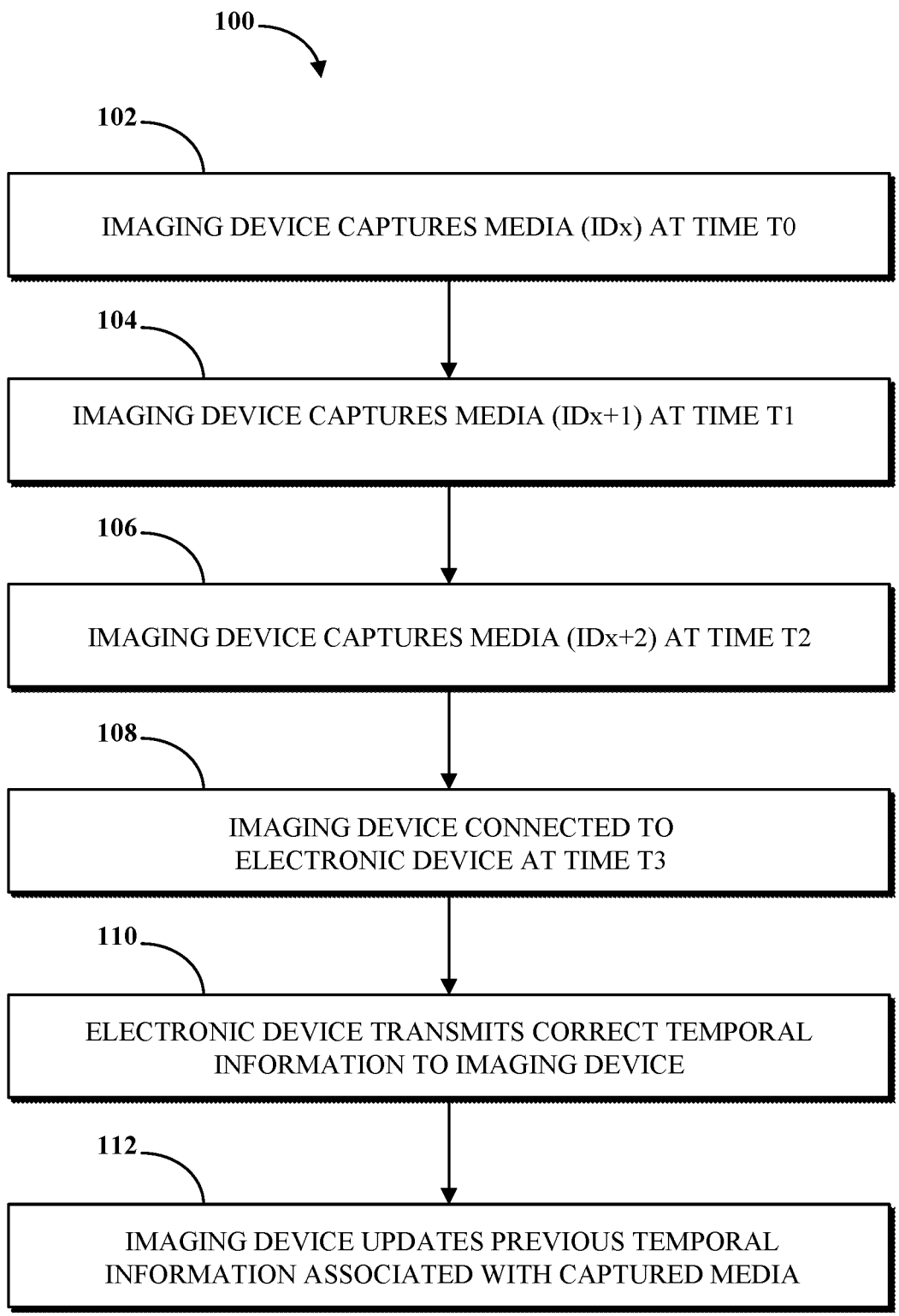
FIG. 1 is a flowchart illustrating an example of a technique of an imaging device using an electronic device for temporal information synchronization.

Imaging devices (e.g., action cameras, digital cameras, DSLR cameras, etc.) capture media, including but not limited to photos and videos. The captured media can be ordered and organized in accordance with a variety of information, including but not limited to temporal information (e.g., date and time information) associated with when the media was captured by the imaging device. Imaging devices can include internal RTCs or other similar clocks to help generate and assign the temporal information to each corresponding captured media. For example, the internal clocks can generate timestamps and then tag each captured media with a corresponding timestamp to help track a sequence order of the captured media. In other words, an imaging device that includes an RTC and is charged (i.e., not suffering from battery issues) can provide temporal information associated with the captured media by tracking the initial time and the time that has elapsed in between captures. The RTC may be powered by a main battery of the imaging device (e.g., a user-removable battery) which powers one or more components of the imaging device. Alternatively, the RTC may be powered by its own battery, which is separate from a main battery of the imaging device.

However, problems occur when the battery used by the RTC becomes depleted or otherwise suffers a malfunction preventing a powering of the RTC. That is, because the RTC requires battery power to properly function and thereby accurately determine the temporal information associated with each captured media, the depletion or malfunction issue suffered by a battery used by the RTC can result in temporal inaccuracies. Once the battery which powers the RTC is depleted or suffers a malfunction, the RTC stops working, thereby resulting in inaccurate temporal information being generated and assigned to captured media post battery depletion or malfunction, which in turn causes organizational issues when a user reviews and edits the captured media.

Implementations of this disclosure address these problems by providing techniques performed by imaging devices that enable temporal information synchronization and accurate maintenance of capture sequences corresponding to captured media. Temporal information synchronization can refer to updating temporal information (i.e., a timestamp including date and time information) generated by an imaging device and associated with a captured media (e.g., a photo being tagged with a timestamp denoting date and time of capture) using temporal information received by the imaging device from another device (e.g., a smartphone) or from a user submission (e.g., via an input interface of the imaging device). Temporal information synchronization can also refer to updating the temporal information (e.g., date and time information) being generated by a RTC of the imaging device using temporal information received by the imaging device from another device (e.g., laptop) or from a user submission (e.g., via a communication received by the imaging device). The imaging device includes memory, including but not limited to any of a persistent memory, non-volatile memory, a similar type of memory, and any combination thereof to enable persistence of the capture sequence associated with the media captured by the imaging device even between battery discharge events (i.e., power cycles). A sequence identifier (e.g., IDx, IDx+1, IDx+n, etc.) can be generated and assigned to each media captured by the imaging device to maintain the capture sequence that will be persistent across power cycles. The sequence identifier can be any type of code, including but not limited to sequential codes, alphanumeric codes, encrypted codes, etc.

In addition, the imaging devices in accordance with this disclosure can perform techniques that detect when a battery discharge event has occurred or is about to occur (e.g., when a battery drain cycle threshold has been reached) to enable the determination of a time offset associated with the temporal information of each captured media. The time offset can be determined or generated by comparing the temporal information (e.g., a timestamp comprising date and time information) assigned to each media by the imaging device's internal clock (e.g., RTC) and the temporal information received by the imaging device from external sources such as user inputs via user interface transmission or such as other electronic devices (e.g., smartphones) via electronic transmission. The temporal information received by the imaging device from external sources can be received by the imaging device once the imaging device has been recharged and begins capturing additional media once again. The temporal information provided by an electronic device connected to a network (e.g., Internet, cellular, etc.) can be verified by applying daylight correction and time zone correction updates. Therefore, methods and systems in accordance with this disclosure provide an imaging device that generates both a unique sequence identifier and unique temporal information (e.g., a timestamp) for each captured media, determines whether any errors in the temporal information may exist, and, if errors are determined, updates and synchronizes the corresponding temporal information.

In addition, the imaging devices in accordance with this disclosure can perform techniques that determine if the temporal information (e.g., a timestamp comprising date and time information) associated with captured media that has a later sequence identifier is incorrectly older than that of the previously captured media (that has an earlier sequence identifier), thereby determining that the temporal information of some of the captured media is inaccurate. Once this is determined, the imaging device can generate a notification request or electronic prompt via an input interface (e.g., an application displayed via a display of the imaging device) to enable the user to manually input the correct date and time information and apply it to the corresponding captured media that has been determined to have the inaccurate temporal information.

For example, if one photo captured by the imaging device has a sequence identifier of ID98 indicating that it was the 98$^{th}$ media captured by the imaging device and also has a timestamp indicating that it was captured on Jan. 27, 2018 at 8:53 p.m., and another photo captured by the imaging device has a sequence identifier of ID78 indicating that it was the 78$^{th}$ media captured (i.e., the ID78 photo was captured approximately 20 photos before the ID98 photo was captured) but has a timestamp indicating that it was captured on Jan. 28, 2018 at 8:59 p.m., which would be approximately one day later than when the ID98 photo was captured, then the imaging device can detect that an error has occurred and flag the ID98 photo with an "incorrect" or "unknown" or similar tag for further review and updating. In this example, the error has occurred because the imaging device detects that a media with a later in time sequence identifier (ID98 is later than ID78) has an earlier in time timestamp. In other words, the ID78 photo was taken before the ID98 photo per the comparative sequence identifiers, thus the timestamp associated with the ID78 photo should also be earlier in time than the timestamp associated with the ID98 photo, but it is not. The imaging device can also flag both the ID78 and ID98 photos for further review, although only flagging later in time sequence identifiers can be possible because the sequence identifiers can be set to always be assigned by the imaging device in a certain sequential order (e.g., ID1, ID2, ID3, etc.).

In this example, after the relevant media, such as the ID98 photo, has been flagged for further review and updating (i.e., a need for temporal information updating or synchronization), the imaging device can prompt the user to properly input the accurate date and time information associated with the ID98 photo, which should be a date and time after Jan. 28, 2018 since that is the date and time when the ID78 photo was captured. The user can input date and time information to update only a subset of the captured media that has been flagged or all of the flagged captured media. The imaging device can take a single user submission of temporal information and apply it to a subset of the captured media or all of the flagged captured media based on the elapsed time recorded by the internal clock in between sequence identifiers. In other words, the user inputted temporal information can be used to determine a time offset between the initially recorded temporal information associated with each captured media, and the time offset can then be applied to the entire sequence of media (or flagged subset) using each respective sequence identifier and corresponding time offset (i.e., calculated or determined by comparing the temporal information initially assigned to the media and the temporal information manually submitted or inputted into the imaging device by the user).

In addition, the imaging devices in accordance with this disclosure can perform techniques that enable the imaging device to connect to an electronic device (e.g., a smartphone with an application) that can inject or transmit the correct date and time for a sequence of captured media that either does not have any temporal information associated with it or a sequence of captured media that has been flagged as likely having incorrect or unknown temporal information (e.g., flagged using an unknown time tag or similar tag because it was captured after a battery discharge event or incorrect date and time settings had been previously applied or variances between sequence identifiers and corresponding timestamps are detected). The temporal information can come from an electronic device with a network connection so that the temporal information is verified as being correct or accurate since it will have had daylight correction and time zone correction and other time-syncing mechanisms applied to it. Once the temporal information is corrected across the sequence of captured media identified as having incorrect or unknown temporal information by receiving a temporal information transmission from another device (such as a smartphone), it can be applied to the entire sequence of captured media using each respective sequence identifier and corresponding time offset.

For example, if the temporal information of a captured media that has been flagged with an unknown time tag because it was captured after a battery discharging event was detected has date and time information of Jan. 1, 2018 at 8:01 p.m., and if the imaging device receives corrected temporal information from a network connected smartphone that states the current time is Jan. 1, 2018 at 9:55 p.m., and if the imaging device's internal clock states that the current time is Jan. 1, 2018 at 9:32 p.m., then a time offset can be calculated as 23 minutes and the flagged media can have its temporal information updated from Jan. 1, 2018 at 8:01 p.m. to Jan. 1, 2018 at 8:24 p.m., which would be 23 minutes later in time and in accordance with the temporal information synchronization provided by the electronic transmission of information between the imaging device and the smartphone. If multiple pieces of media are flagged, they can all receive updated timestamps based on the calculated time offset. In addition, the user can select to update all corresponding timestamps regardless of whether the captured media has been flagged.

In addition, the imaging devices in accordance with this disclosure can perform techniques that enable the imaging device to maintain the capture sequence of the media in the case of multiple charge events (e.g., the battery of the imaging device discharges multiple times). The technique can provide for another identifier that groups each media in accordance with the battery drain cycle with which it is associated. For example, if an imaging device captures 100 pieces of media before the battery dies, then the imaging device can generate and assign a unique sequence identifier (ID1 to ID100) and corresponding temporal information (determined using the internal real time clock of the imaging device) to each of the 100 pieces of media. In addition, the imaging device can generate and assign a unique battery drain cycle identifier (e.g., BDC1) to each of the 100 pieces of media (i.e., all 100 pieces of media will have different sequence identifiers ID1 to ID100 but the same battery drain cycle identifier BDC1). After the imaging device has been recharged and captures another 100 pieces of media before the battery dies for a second time, the imaging device can assign sequence identifiers in accordance with the overall sequence (i.e., the second set of 100 pieces of media will be assigned ID101 to ID200) and can assign another unique battery drain cycle identifier (e.g., BDC2) to each of the additional 100 pieces of media. The separation of the captured media between battery drain cycles using the differentiated battery drain cycle identifiers (i.e., a BDC1 group of media versus a BDC2 group of media) enables the date and time information within each group to be separately updated based on manual user input or automated electronic device input.

To describe some implementations in greater detail, reference is made to examples of techniques and imaging device structures which may be used.

FIG. 1 is a flowchart illustrating an example of a technique 100 of an imaging device using an electronic device for temporal information synchronization in accordance with an implementation. The technique 100 describes operations performed in connection with the updating or other use of temporal information, including, but not limited to, in situations in which temporal information for captured media is incorrect. An imaging device that carries out the technique 100 can be any of a variety of imaging devices, including but not limited to action cameras and digital cameras. The imaging device can include any of a persistent memory, non-volatile memory, removable memory, removable battery, and non-removable battery. In some implementations, the imaging device includes a persistent memory and a non-removable battery. The technique 100 illustrates a non-battery depleted implementation when the imaging device does not experience a battery depletion or discharge that could affect an internal real time clock's ability to properly assign temporal information to each captured media (i.e., the battery of the imaging device has not yet completely discharged/died or has not yet discharged below a predefined battery drain cycle threshold).

At 102, the imaging device captures a first media (e.g., a photo, video, etc.) with a corresponding first sequence identifier IDx (e.g., ID0 when x=0) at a first time T0. The sequence identifier IDx can be generated and assigned by the imaging device. The sequence identifier IDx can be a variety of codes generated in sequential order (e.g., ID1, ID2, ID3, etc.) or non-sequential order but based upon a patterning scheme or an encryption scheme. T0 can be associated with temporal information including but not limited to date and time information (e.g., T0=Jan. 1, 2018 at 9:57 p.m.). At 104, the imaging device captures a second media with a corresponding second sequence identifier IDx+1 (e.g., ID1 when x=0) at a second time T1. The second time T1 is at a later time than the first time T0 (e.g., T0<T1, T1=Jan. 1, 2018 at 10:13 p.m.). At 106, the imaging device captures a third media with a corresponding third sequence identifier IDx+2 (e.g., ID2 when x=0) at a third time T2. The third time T2 is at a later time than both the first time T0 and the second time T1 (e.g., T0<T1<T2, T2=Jan. 1, 2018 at 10:57 p.m.). The imaging device can capture additional media with corresponding additional sequence identifiers (e.g., ID3 . . . IDn) at subsequent times (e.g., Tn). Each of the timestamps or temporal information associated with the first time (T0), second time (T1), third time (T2), and any subsequent times can be generated and tagged to the corresponding captured media using a RTC or similar internal clock of the imaging device.

At 108, the imaging device is connected to an electronic device at a fourth time T3 that is at a later time than the first time T0, the second time T1, and the third time T2. The electronic device can be any of a variety of devices, including but not limited to a smartphone with wireless or wired connectivity to a network (e.g., Internet, cellular, etc.) that enables the smartphone to have accurate (i.e., correct) temporal information (i.e., date and time information) that has been at least daylight and time zone correction updated via the network. Time zone correction may, for example, include using geolocation coordinates of the smartphone (e.g., derived using the Global Positioning System (GPS), Galileo, or another global navigation satellite system) to determine a time zone within which captured media was captured. In the event a time zone associated with a timestamp for the captured media corresponds to an incorrect time zone, a time zone offset can be used to update the time zone associated with that timestamp. In some implementations, the geolocation coordinates corresponding to a captured media can be recorded at the time the captured media is captured. In some implementations, the geolocation coordinates can be recorded responsive to a determination to perform time zone correction. At 110, the electronic device injects or transmits to the imaging device the correct temporal information that can be stored in a memory of the imaging device. The received correct temporal information is compared to the previous temporal information generated by the imaging device's internal clock (e.g., RTC) for each captured media, and a correlation is determined (e.g., a differential or time offset between the received correct temporal information and each previous temporal information associated with each captured media is determined or calculated by the imaging device). The received correct temporal information may represent time information derived from a geolocation network. For example, the time information derived from a geolocation network may be or refer to an offset from a Universal Time Coordinated (UTC) time identified by or otherwise using GPS, Galileo, or another global navigation satellite system. Alternatively, the received correct temporal information may represent time information derived from the electronic device itself. For example, the time information derived from the electronic device may be or refer to an offset from a time established by one or more software applications or other components running at the electronic device.

At 112, the imaging device updates the previous temporal information associated with the captured media using the time offset determined using the correct temporal information received from the electronic device. All or a subset of the captured media's initial temporal information can be updated. For example, if the imaging device has captured 100 media and the time offset is calculated as 8 minutes, indicating that the correct temporal information is 8 minutes later (e.g., if a timestamp says 1:00 p.m. but should say 1:08 p.m.), then the 100 corresponding timestamps (i.e., temporal information) corresponding to each 100 media can be pushed forward by 8 minutes. The subset of the captured media that receives a temporal information update can be selected (e.g., by a user of the imaging device) or can be automatically predetermined based on a comparison of the corresponding temporal information of the captured media (i.e., looking for machine learned incorrect patterns between the sequence identifier increasing across the captured media sequence and the corresponding temporal information between the captured media sequence).

Figure 2:
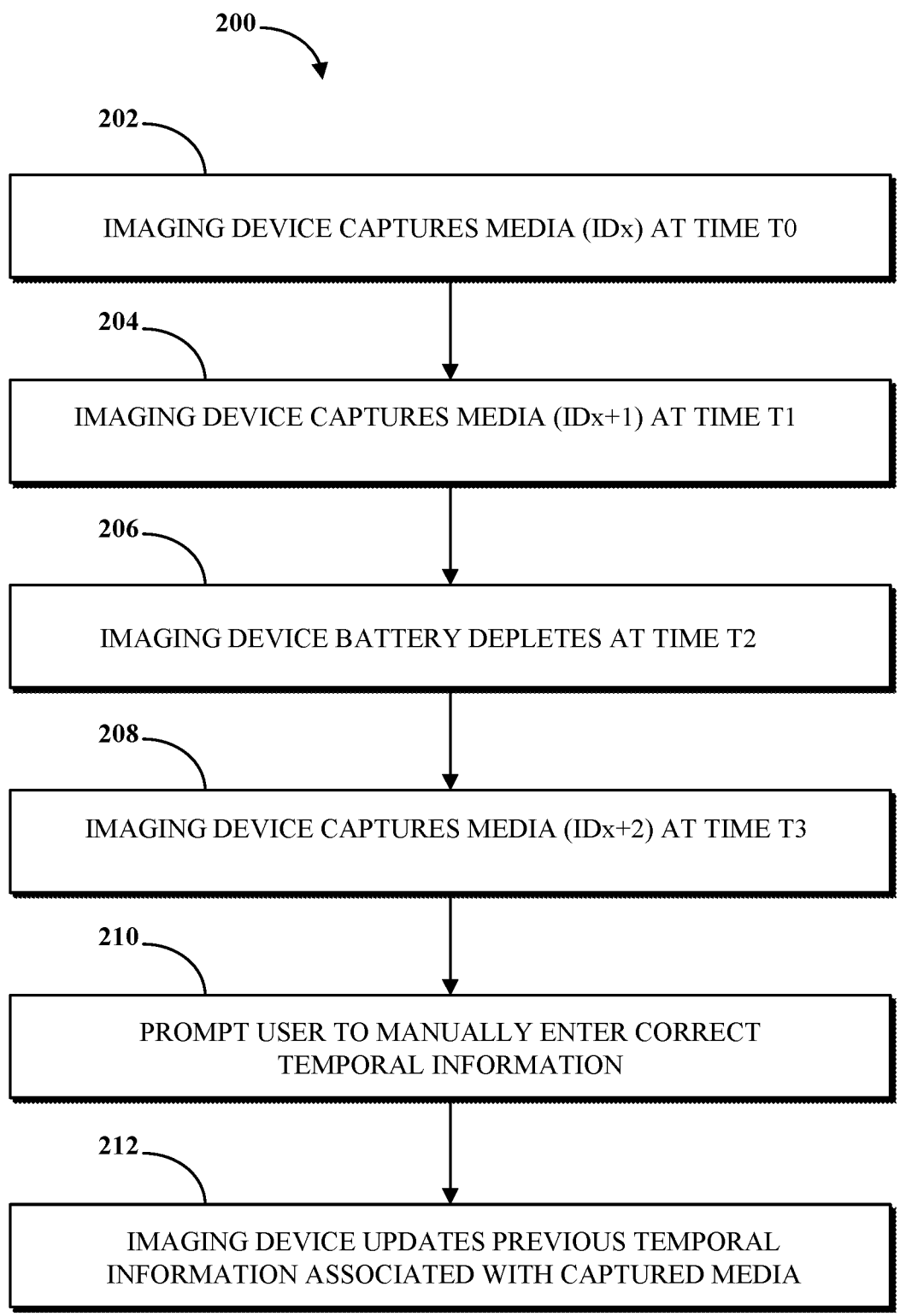
FIG. 2 is a flowchart illustrating an example of a technique of an imaging device using a notification prompt for temporal information synchronization.

FIG. 2 is a flowchart illustrating an example of a technique 200 of an imaging device using a notification prompt for temporal information synchronization in accordance with an implementation. The technique 200 describes operations performed in connection with the updating or other use of temporal information, including, but not limited to, in situations in which temporal information for captured media is incorrect. An imaging device that carries out the technique 200 can be any of a variety of imaging devices, including but not limited to action cameras and digital cameras. The imaging device can include any of a persistent memory, non-volatile memory, removable memory, removable battery, and non-removable battery. In some implementations, the imaging device includes a persistent memory and a non-removable battery. The technique 200 illustrates a battery depleted implementation when the imaging device experiences a battery discharge or battery drain cycle that could affect an internal real time clock's ability to properly assign temporal information to each captured media (i.e., the battery of the imaging device has completely discharged/died or has discharged to a predefined battery drain cycle threshold before the time when the temporal information synchronization is conducted).

At 202, similar to 102 of FIG. 1, the imaging device captures a first media (e.g., a photo, video, etc.) with a corresponding first sequence identifier IDx (e.g., ID0 when x=0) at a first time T0. The sequence identifier IDx can be generated and assigned by the imaging device. The sequence identifier IDx can be a variety of codes generated in sequential order (e.g., ID1, ID2, ID3, etc.) or non-sequential order but based upon a patterning scheme or an encryption scheme. The first time T0 can be associated with temporal information, including but not limited to date and time information (e.g., T0=Jan. 1, 2018 at 9:57 p.m.). At 204, similar to 104 of FIG. 2, the imaging device captures a second media with a corresponding second sequence identifier IDx+1 (e.g., ID1 when x=0) at a second time T1. The second time T1 is at a later time than the first time T0 (e.g., T0<T1, T1=Jan. 1, 2018 at 10:13 p.m.). At 206, the battery of the imaging device either completely depletes (i.e., discharges or dies) or the battery level goes below a predefined threshold (both can be referred to as a "battery depletion event") at a third time T2 that is later than both the first time (T0) and the second time (T1). All of the media that has been captured after the third time T2 can be assigned a tag, including but not limited to an unknown time tag or an incorrect tag or similar tagging or flagging information. Therefore, in this example, the first media with the first sequence identifier IDx and the second media with the second sequence identifier IDx+1 do not receive an unknown time tag (or similar tag) because these two media were captured prior (at times T0 and T1) to the battery depletion event that occurred at T2 and when the RTC of the imaging device was still functioning properly.

At 208, similar to 106 of FIG. 1, the imaging device captures a third media with a corresponding third sequence identifier IDx+2 (e.g., ID2 when x=0) at a fourth time T3 after the imaging device has been fully charged or recharged to a certain level following the battery depletion event that occurred at the third time T2. The fourth time T3 is at a later time than the first time T0, the second time T1, and the third time T2 (e.g., T0<T1<T2<T3, T3=Jan. 1, 2018 at 11:23 p.m.). The third media with the third sequence identifier IDx+2 (and any subsequently captured media post battery depletion event) receives an unknown time tag (or similar tag) because, although the battery of the imaging device has been recharged, the temporal information generated by the real time clock is potentially inaccurate (or less accurate) due to the battery depletion event that occurred at T2 in 206 that resulted in the RTC not functioning properly during the imaging device's discharged period (i.e., when the imaging device battery is dead). The imaging device can capture additional media with corresponding additional sequence identifiers (e.g., ID3 . . . IDn) at subsequent times after the battery discharging event 206, and each captured media will be tagged with the unknown time tag in addition to the potentially inaccurate temporal information from the RTC and any other information (e.g., metadata). Each of the timestamps or temporal information associated with the first time (T0), second time (T1), fourth time (T3), and any subsequent times can be generated and tagged to the corresponding captured media using a RTC or similar internal clock of the imaging device.

At 210, once a user of the imaging device reviews media that has been tagged with the unknown time tag or after a predefined time period of usage of the imaging device or because a threshold number of unknown time tags has been reached or other predefined conditions have been met, the user can be prompted via an input interface of the imaging device with a notification prompt request to submit the correct temporal information (for example, the user can manually input the correct temporal information directly via an input display interface of the imaging device or indirectly via an application in communication with the imaging device, or, in another example, the user can indicate to use a time derived from a geolocation network or a software application or other component). The correct temporal information either can be associated with a current time (i.e., the date and time at which the user is prompted to enter, and manually enters, the temporal information) or can be associated with a previous point in time associated with a specific captured media that the user recalls (e.g., a certain photo that was taken at 9:00 a.m. on a specific date). The submitted correct temporal information that is received by the imaging device is compared to the previous temporal information generated by the imaging device's internal clock (e.g., RTC) for each captured media being updated (i.e., receiving temporal information synchronization), and a correlation is determined (e.g., a differential or time offset is determined or calculated between the submitted correct temporal information and each previous temporal information associated with each captured media being updated (which could be the entire set of captured media)).

At 212, the imaging device updates the previous temporal information associated with each captured media using the time offset determined using the correct temporal information received from the manual input of the user via an input interface of the imaging device or via an application in communication with the imaging device. All of the captured media's initial temporal information or one or more subsets of the captured media's initial temporal information can be updated. For example, the subset of the captured media that receives a temporal information update can be restricted to only the captured media that included an unknown time tag or can be selected (e.g., by a user of the imaging device) or can be automatically predetermined based on a comparison of the corresponding temporal information between the captured media (i.e., looking for machine learned incorrect patterns between the sequence identifier increasing across the captured media sequence and the corresponding temporal information between the captured media sequence). In another example, a subset of the captured media's initial temporal information which is before given captured media and a subset of the captured media's initial temporal information which is after the given captured media may both be updated using the time offset. Other examples of portions of the captured media's initial temporal information which may be updated using the time offset are possible.

Figure 3:
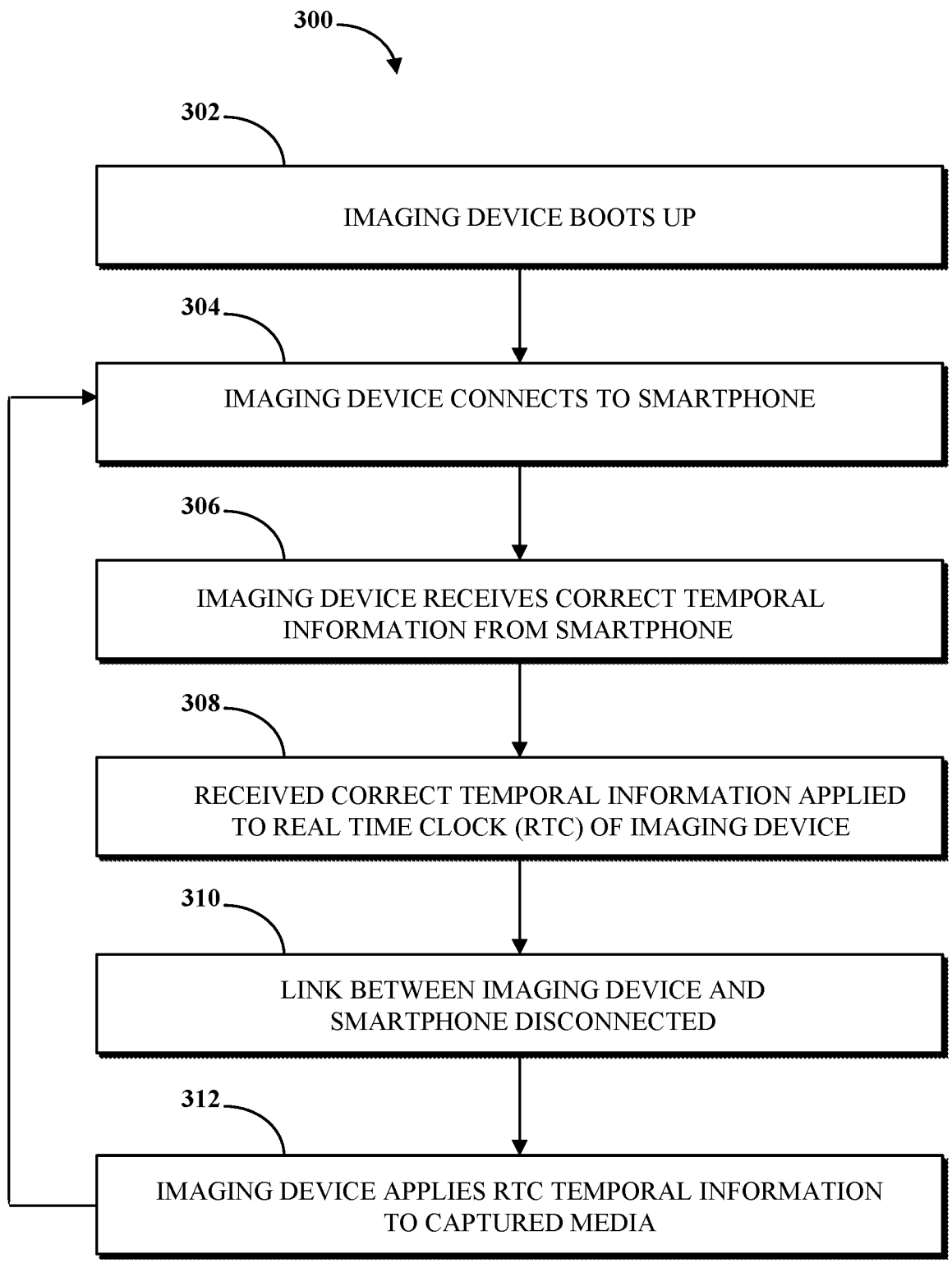
FIG. 3 is a flowchart illustrating an example of a technique for synchronizing temporal information between a real time clock of an imaging device and a smartphone.

FIG. 3 is a flowchart illustrating an example of a technique 300 for synchronizing temporal information between a real time clock of an imaging device and a smartphone in accordance with an implementation. The technique 300 describes operations performed in connection with the updating or other use of temporal information, including, but not limited to, in situations in which temporal information for captured media is incorrect. An imaging device that carries out the technique 300 can be any of a variety of imaging devices, including but not limited to action cameras and digital cameras. The imaging device can include any of a persistent memory, non-volatile memory, removable memory, removable battery, and non-removable battery. In some implementations, the imaging device includes a persistent memory and a non-removable battery. The technique 300 illustrates continuously or repeatedly syncing an internal RTC or similar internal clock of an imaging device with an electronic device (e.g., a smartphone) that is external to and in communication with the imaging device. The electronic device is connected to a network (e.g., Internet, cellular, etc.). In some implementations, the electronic device can be internal to the imaging device.

At 302, the imaging device boots up or is turned on. The imaging device can be turned on for the first time after manufacturing, or the imaging device can be turned on after previously being turned off or in an off power state. At 304, the imaging device connects with an electronic device, such as a smartphone. At 306, the imaging device receives correct temporal information (i.e., date and time information) from the smartphone. The correct temporal information may represent, for example, time information derived from a geolocation network, or, in another example, time information derived from the smartphone (or other electronic device, as the case may be). The temporal information transmitted by the smartphone is correct (i.e., accurate) because the smartphone is connected to a network (e.g., Internet, cellular, etc.) that enables at least daylight correction and time zone correction. The time zone correction may, for example, include using geolocation coordinates of the smartphone to determine a time zone within which given captured media was captured and update a time zone associated with a timestamp for the captured media using a time zone offset. The smartphone can automatically send the correct temporal information once connected with the imaging device, or the correct temporal information can be transmitted in response to a request. At 308, the correct temporal information received from the smartphone is applied to a RTC or similar internal clock of the imaging device to update or synchronize the temporal information being generated by the RTC with the correct temporal information. The synchronization counters clock drift of the RTC. At 310, the connection or link between the smartphone and the imaging device is disconnected or lost. At 312, the imaging device generates temporal information using the recently synced or updated RTC and applies the generated temporal information to corresponding media captured by the imaging device. After 312, the technique 300 can optionally return to 304, where the imaging device reconnects to the smartphone to resync the RTC temporal information with the latest correct temporal information transmitted from the smartphone and to the imaging device.

Figure 4:
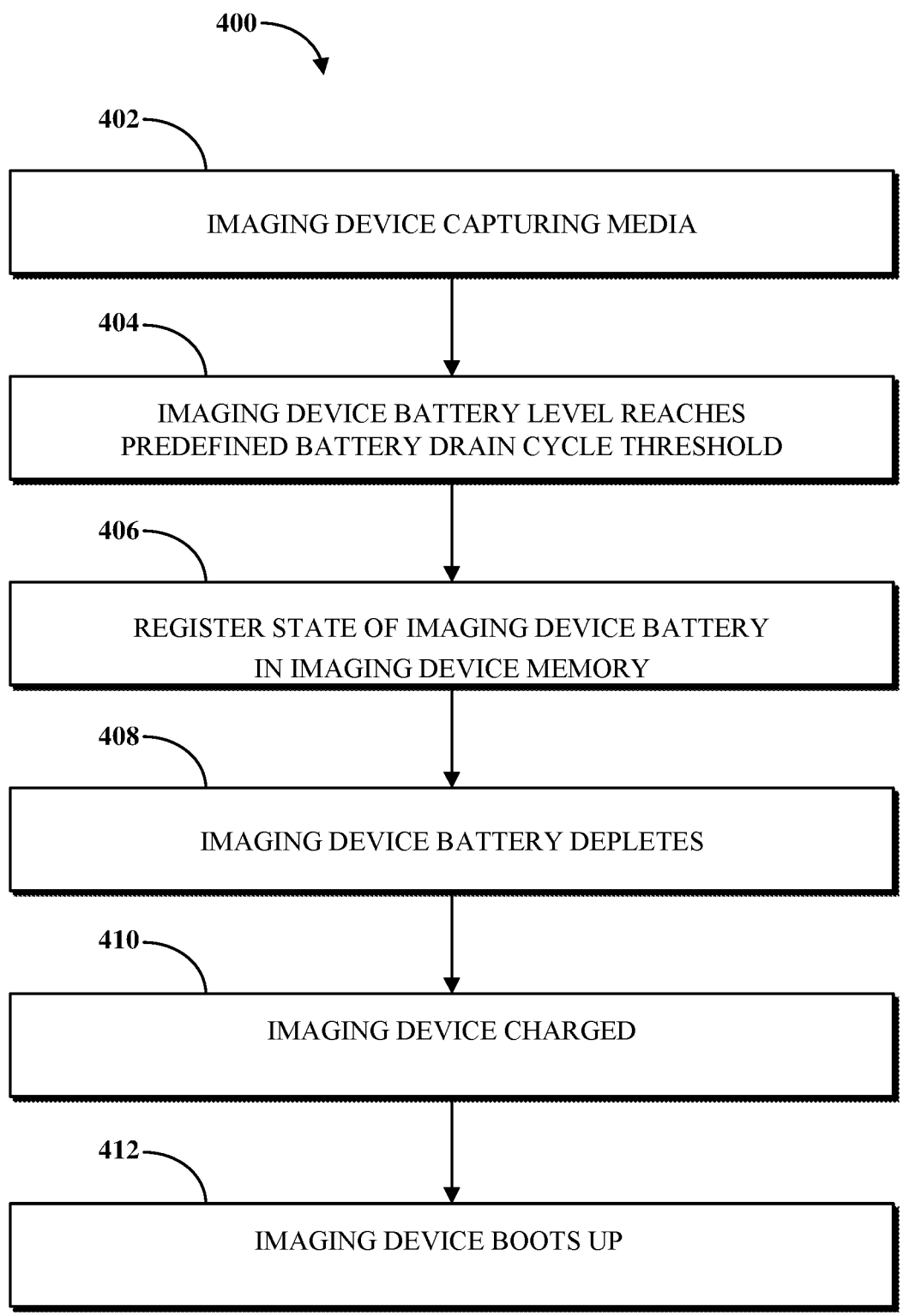
FIG. 4 is a flowchart illustrating an example of a technique for registering a state of an imaging device battery in an imaging device memory.

FIG. 4 is a flowchart illustrating an example of a technique 400 for registering a state of an imaging device battery in an imaging device memory in accordance with an implementation. An imaging device that carries out the technique 400 can be any of a variety of imaging devices, including but not limited to action cameras and digital cameras. The imaging device can include any of a persistent memory, non-volatile memory, removable memory, removable battery, and non-removable battery. In some implementations, the imaging device includes a persistent memory and a non-removable battery. The technique 400 illustrates registering a state of the imaging device battery in a memory of the imaging device. The state of the imaging device battery can be subsequently used to determine which captured media temporal information to update or requires an update (e.g., because the temporal information is incorrect).

At 402, the imaging device is capturing media during an on state with adequate battery level. At 404, the imaging device battery level reaches a predefined battery drain cycle threshold. The battery drain cycle threshold can include but is not limited to 10% to 20% battery level being left (i.e., 90% to 80% of the imaging device battery has been consumed) or a variety of other battery level percentages and/or ranges. At 406, a state or status of the imaging device battery is registered within a memory of the imaging device. The memory can be a persistent memory or storage to enable the imaging device to continuously track previous battery states at the time of media capture.

The state of the battery can indicate that the battery level is either above or below the battery drain cycle threshold or can indicate other information associated with the battery (e.g., damaged, overheating, etc.). For example, if the battery level is above the battery drain cycle threshold, then the state can be registered as "TIMESENSE=TRUE," and if the battery level is below the battery drain cycle threshold, then the state can be registered as "TIMESENSE=FALSE." The imaging device can be turned off or in an off state and still have a battery level that is above the battery drain cycle threshold. In addition, the imaging device can be turned off and still have a battery level that is below the battery drain cycle threshold but not yet fully depleted or discharged. In this example, a "TIMESENSE=FALSE" designation would indicate that the battery level is low and the imaging device is about to die, and so the media captured during and/or after this time period can be flagged with an unknown time tag or similar tag (e.g., incorrect time tag). The "TIMESENSE=FALSE" designation can also be recorded when complete imaging device battery depletion is imminent.

In addition to the state of the battery, other battery drain cycle information (e.g., battery drain cycle frequency information) can be tracked and registered or recorded in the imaging device memory. For example, if the imaging device battery has not yet depleted or discharged below the predefined battery drain cycle threshold and it subsequently does so for the very first time, the battery drain cycle frequency information can be registered as "BATTERYDRAINCYCLE=1." After the imaging device has been recharged, and the imaging device subsequently discharges once again either completely or below the predefined battery drain cycle threshold, the battery drain cycle frequency information can be registered as "BATTERYDRAINCYCLE=2" and so on. Media that is captured during certain battery drain cycles can be tagged with corresponding information. For example, a photo captured after the imaging device battery has depleted three times can be tagged with "BATTERYDRAINCYCLE=3," denoting that the photo was captured by an imaging device that has depleted three times previously.

At 408, the imaging device battery can optionally deplete or discharge completely. At 410, after the imaging device battery either completely depletes or merely depletes to a level below the battery drain cycle threshold, the imaging device can be recharged. At 412, the imaging device can optionally boot back up or be turned back on if the charging occurred after the imaging device battery is recharged, and the user can begin capturing media once again with the imaging device. The imaging device battery state and battery drain cycle frequency information and any other related information will still be stored in the persistent memory throughout the various power cycles that the imaging device goes through.

Figure 5:
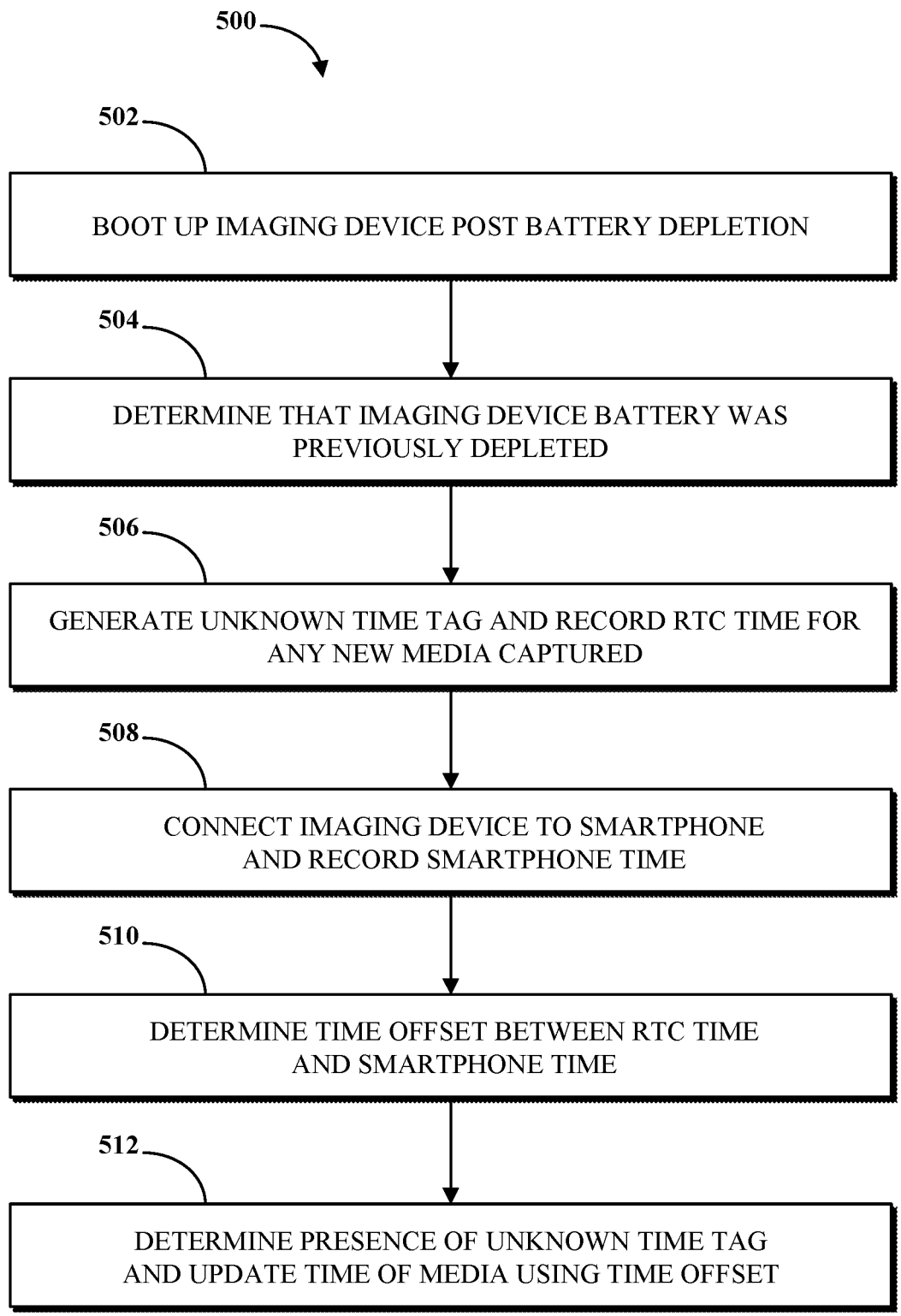
FIG. 5 is a flowchart illustrating an example of a technique of an imaging device using a smartphone for temporal information synchronization.

FIG. 5 is a flowchart illustrating an example of a technique 500 of an imaging device using a smartphone for temporal information synchronization in accordance with an implementation. The technique 500 describes operations performed in connection with the updating or other use of temporal information, including, but not limited to, in situations in which temporal information for captured media is incorrect. An imaging device that carries out the technique 500 can be any of a variety of imaging devices, including but not limited to action cameras and digital cameras. The imaging device can include any of a persistent memory, non-volatile memory, removable memory, removable battery, and non-removable battery. In some implementations, the imaging device includes a persistent memory and a non-removable battery. The technique 500 illustrates an implementation when the imaging device has previously experienced a battery depletion or discharge that could affect an internal real time clock's ability to properly assign temporal information to each captured media (i.e., the battery of the imaging device has completely discharged/died or has discharged below a predefined battery drain cycle threshold).

At 502, the imaging device is booted up or turned back on after previously experiencing a battery depletion that is either complete (i.e., the imaging device battery completely discharges) or partial (i.e., the imaging device battery level drops below a predefined battery drain cycle threshold). At 504, the imaging device determines or confirms that the imaging device battery has previously experienced a battery depletion by checking for the "TIMESENSE=FALSE" battery state designation (i.e., flag) in a persistent memory of the imaging device. The battery state designation can be assigned using a process similar to 406 of FIG. 4. If the battery state designation is instead determined to be "TIMESENSE=TRUE," then the imaging device battery has not previously depleted and the technique 500 would end and not proceed to 506. At 506, an unknown time tag and a current RTC time (i.e., using the imaging device's internal RTC or similar clock) are generated and associated with any new media captured by the imaging device after the "TIMESENSE=FALSE" battery state recordation.

For example, if the imaging device battery depletes below the battery drain cycle threshold on Jan. 1, 2018 at 9:02 a.m. as recorded by the imaging device's internal RTC, the "TIMESENSE=FALSE" battery state is recorded in the imaging device's persistent memory subsequently thereafter at approximately Jan. 1, 2018 at 9:02 a.m. After the imaging device has been recharged, and the battery level is fully charged or at least charged to above the battery drain cycle threshold, each media that is newly captured by the imaging device after the battery depletion event that led to the "TIMESENSE=FALSE" tag will be marked with an unknown time tag and the current RTC time (referred to as "RTC time"). When the imaging device is connected to an electronic device (such as a smartphone) to receive the correct temporal information which is synced with the RTC's temporal information, the battery state designation can switch from "TIMESENSE=FALSE" to "TIMESENSE=TRUE," indicating that the temporal information is now more accurate.

At 508, the imaging device is connected to the smartphone and the correct temporal information including date and time information (referred to as "smartphone time") is received from the smartphone and recorded by the imaging device. As aforementioned, the battery state designation recorded in the persistent memory of the imaging device switches from "TIMESENSE=FALSE" to "TIMESENSE=TRUE" because the imaging device will have updated and synchronized the RTC time with the correct time from the smartphone. At 510, a time offset is determined between the RTC time and the smartphone time. The time offset can be determined or calculated by comparing only the last captured media's RTC time with the correct smartphone time or can be determined by comparing the RTC time of all or a subset of the captured media (e.g., captured media that includes an unknown time tag) with the correct smartphone time. At 512, the imaging device determines which of the captured media includes the unknown time tag (i.e., media that was captured during a "TIMESENSE=FALSE" battery state designation, denoting that the RTC time associated with the captured media during this time is likely at least slightly inaccurate) and updates the timestamp or temporal information associated with the captured media that includes the unknown time tag using the time offset previously calculated in 510. In other words, the time of each media with an unknown time tag is updated using the time offset generated using the temporal information from the smartphone.

The imaging device can also optionally analyze whether the battery drain cycle frequency information matches the current battery drain cycle and then only update the timestamp or temporal information associated with the captured media that includes an unknown time tag and a matching of the battery drain cycle frequency information. For example, if the imaging device battery has only depleted once, then the battery drain cycle frequency information will be designated as "BATTERYDRAINCYCLE=1" in the persistent memory. Any captured media that includes an unknown time tag (because it was captured by the imaging device after the battery had depleted at least below the battery drain cycle threshold so that the battery state designation is "TIMESENSE=FALSE") and that was captured during the time period when the imaging device battery drain cycle frequency information was marked as "BATTERYDRAINCYCLE=1" can be updated with the correct time from the smartphone (i.e., the previous RTC time is updated with the correct smartphone time). Any captured media with a different battery drain cycle frequency information tag (such as "BATTERYDRAINCYCLE=0") can be optionally removed from the updating process or still included.

Figure 6:
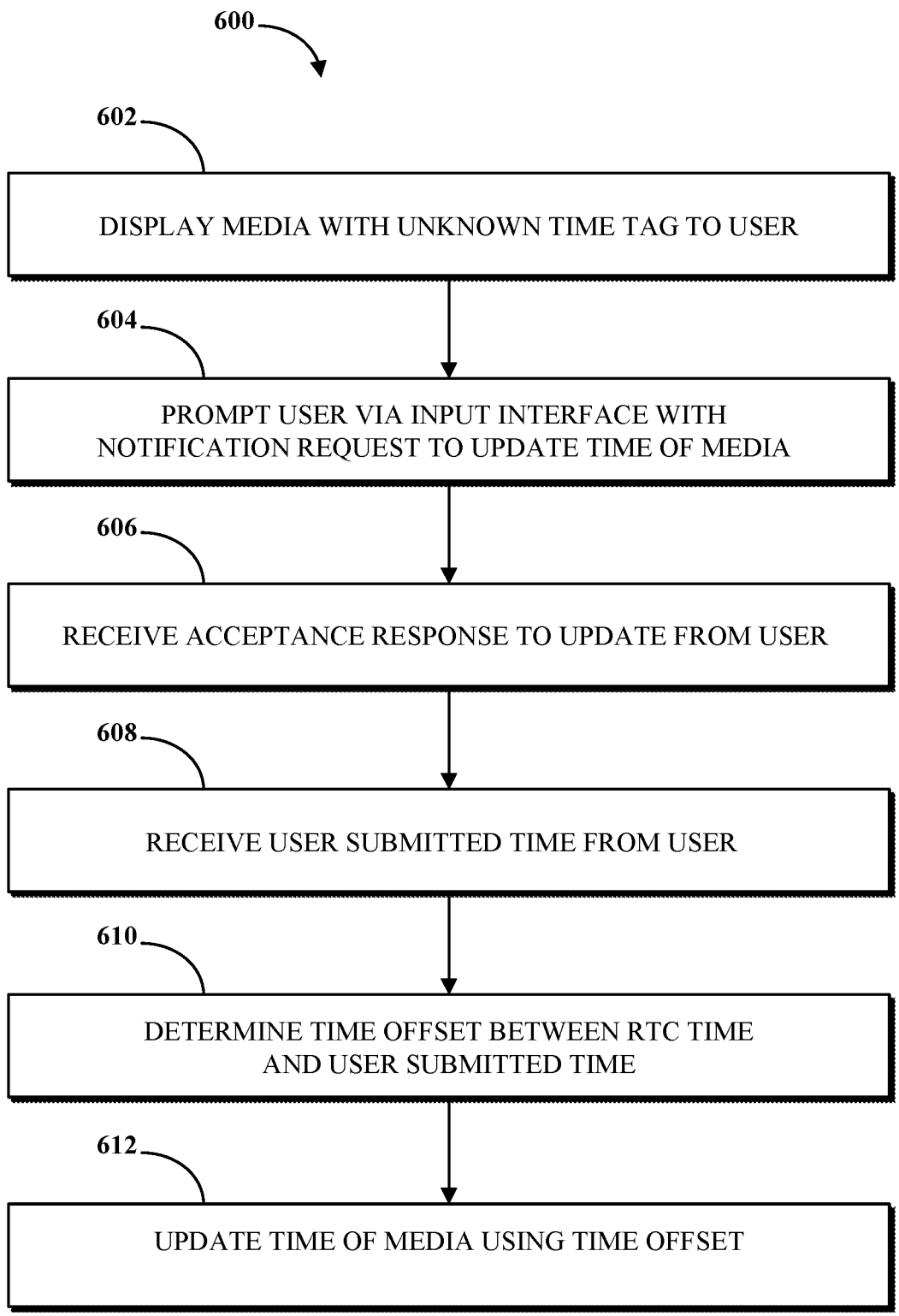
FIG. 6 is a flowchart illustrating an example of a technique of an imaging device using a notification prompt for temporal information synchronization.

FIG. 6 is a flowchart illustrating an example of a technique 600 of an imaging device using a notification prompt for temporal information synchronization in accordance with an implementation. The technique 600 describes operations performed in connection with the updating or other use of temporal information, including, but not limited to, in situations in which temporal information for captured media is incorrect. An imaging device that carries out the technique 600 can be any of a variety of imaging devices, including but not limited to action cameras and digital cameras. The imaging device can include any of a persistent memory, non-volatile memory, removable memory, removable battery, and non-removable battery. In some implementations, the imaging device includes a persistent memory and a non-removable battery. The technique 600 illustrates an implementation when the imaging device has previously experienced a battery depletion or discharge that could affect an internal real time clock's ability to properly assign temporal information to each captured media (i.e., the battery of the imaging device has completely discharged/died or has discharged below a predefined battery drain cycle threshold).

At 602, a user of an imaging device reviews captured media that includes an unknown time tag or similar tag. The unknown time tag can be generated and associated with a corresponding media by the imaging device in response to a battery depletion event (e.g., operation 504 of FIG. 5), or the unknown time tag can be due to a system error or another reason. The user can access this captured media by entering a media gallery mode of the imaging device and selecting or filtering to view all media that includes an unknown time tag via an input interface (e.g., display) of the imaging device. The user can filter the media in the media gallery using a variety of filters, including but not limited to a "view media with known times" filter and a "view media with unknown times" filter. At 604, after the user has filtered the media gallery to display only the captured media that include unknown time tags (i.e., unknown times), the imaging device can prompt the user via the input interface of the imaging device with a notification request (e.g., a notification request can be prompted for display on the input interface of the imaging device). The notification request can request that the user provide a response (e.g., enter information into the imaging device via the input interface) to update the time of the captured media that includes unknown time tags (i.e., media including the unknown times).

At 606, the imaging device receives an acceptance response indicating that the user has agreed to update the time of the captured media that includes unknown times. The acceptance response can be optional, and the user can instead submit the temporal information without first responding to the notification prompt sent by the imaging device. If the user does not accept, the technique 600 ends at 604. At 608, the imaging device receives a user submitted time from the user (i.e., the temporal information submitted by the user in response to the notification prompt). The user submitted time can correlate with a current time (e.g., the user submits that the current time or time that the submission is being made is Jan. 11, 2018 at 4:55 p.m.) or a previous time that is associated with a captured media that includes an unknown time tag that the user is viewing (e.g., the user submits that the time a certain photo was taken was Jan. 10, 2018 at 11:00 a.m.).

At 610, the imaging device determines a time offset between the RTC time associated with the captured media that includes the unknown time tags and the user submitted time. The time offset can be determined for one particular media or a plurality of media (e.g., if 10 photos have unknown time tags the time offset can be calculated by comparing the RTC time of each of the 10 photos, and the user submitted time or the time offset can be calculated by comparing the RTC time of a subset of the 10 photos and the user submitted time). At 612, the imaging device updates the timestamp or temporal information associated with each captured media that includes the unknown time tag that the user was prompted to update using the time offset previously calculated in 610 (i.e., determined by comparing the user submitted time and the corresponding RTC time). In other words, the time of each media with an unknown time tag is updated using the time offset generated via the user submission. In some implementations, only the media that also is tagged with the corresponding battery drain cycle frequency information (e.g., "BATTERYDRAINCYCLE=X") is updated.

Figure 7:
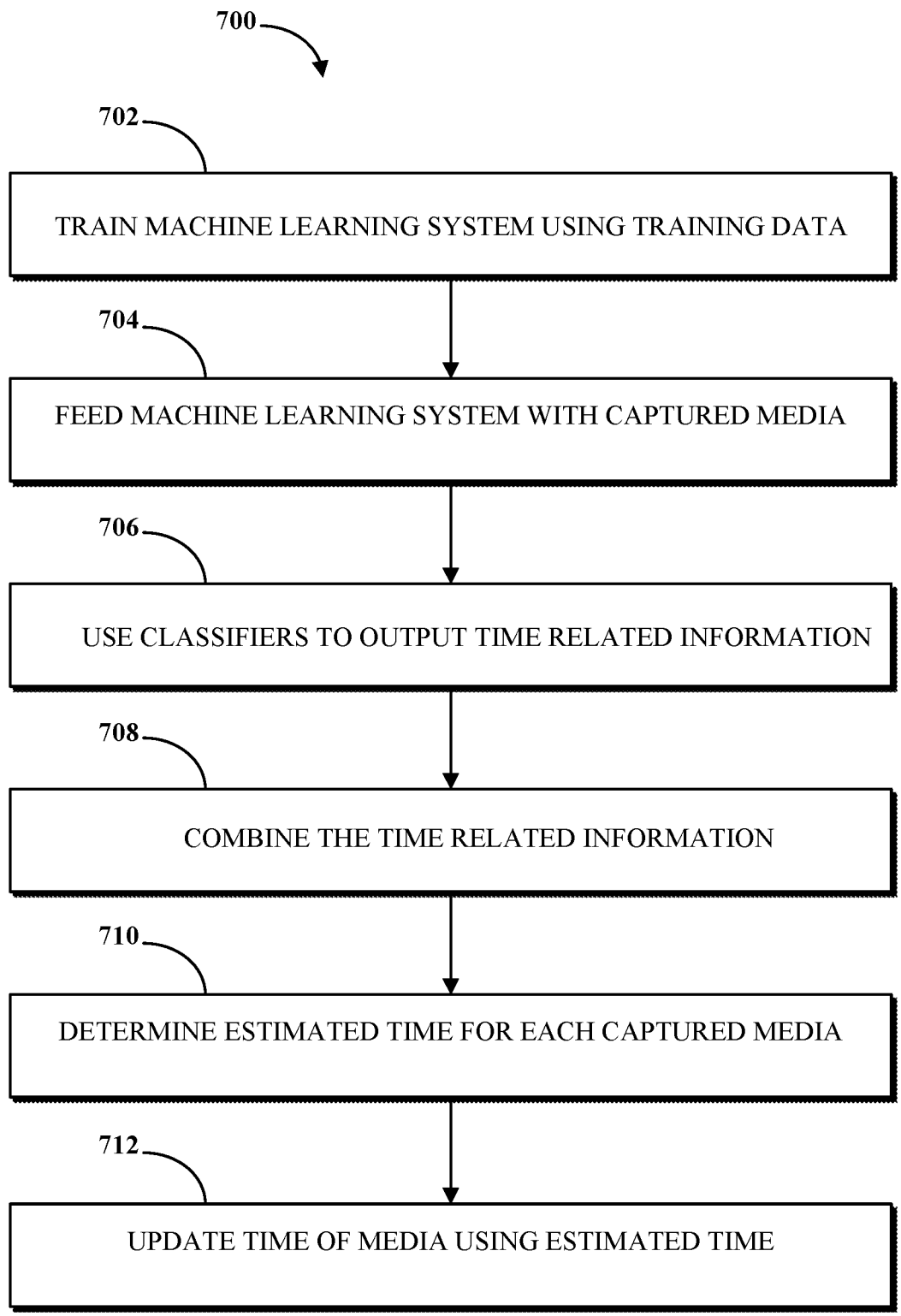
FIG. 7 is a flowchart illustrating an example of a technique of an imaging device using machine learning for temporal information synchronization.

FIG. 7 is a flowchart illustrating an example of a technique 700 of an imaging device using machine learning for temporal information synchronization in accordance with an implementation. The technique 700 describes operations performed in connection with the updating or other use of temporal information, including, but not limited to, in situations in which temporal information for captured media is incorrect. An imaging device that carries out the technique 700 can be any of a variety of imaging devices, including but not limited to action cameras and digital cameras. The imaging device can include any of a persistent memory, non-volatile memory, removable memory, removable battery, and non-removable battery. In some implementations, the imaging device includes a persistent memory and a non-removable battery. The technique 700 illustrates an imaging device utilizing machine learning processes and algorithms to determine an estimated time associated with captured media.

At 702, a machine learning system including machine learning algorithms of the imaging device is trained using training data. The training data includes example media with varying GPS coordinate information, recognized object information, lighting information, and other information, including but not limited to metadata associated with previously captured media. The GPS coordinate information can include embedded GPS coordinates in the media that help determine a specific location where the media was captured. For example, the recognized object information can detect known objects, such as famous buildings (e.g., "Big Ben" in London), to help determine a specific location where the media was captured, particularly when GPS coordinates are not available. The lighting information can look at the amount of light or the direction of the light in the media to help determine the time of day it was captured when combined with location information. The lighting information of the captured media can be compared against a continuously updated database of locations and corresponding lighting information at certain times of day to help narrow down a range of capture times. At 704, the machine learning system is fed with the captured media that can include unknown time tags. The unknown time tag or similar tag can be generated in response to a battery depletion event (e.g., operation 504 of FIG. 5) or can be generated due to a system error or another reason.

At 706, the machine learning system utilizes machine learning classifiers and algorithms to output time-related information associated with the captured media that includes the unknown time tags. For example, if a specific photo of the captured media includes bright lighting with shadows oriented in a certain direction, the machine learning system may output time-related information that comprises a certain time range (e.g., 10:00 a.m. to 2:00 p.m.) within which the photo could have been taken. At 708, the time-related information generated for each captured media is combined by the machine learning system to provide combined time-related information for each captured media. For example, in addition to the aforementioned bright lighting and shadow orientation information, the specific photo could have embedded GPS coordinates of a specific location where the lighting could only have occurred during a narrower time range (e.g., 12:30 p.m. to 1:00 p.m.).

At 710, the imaging device generates an estimated time for each captured media using the combined time-related information for each captured media. At 712, the imaging device updates the timestamp or temporal information (e.g., date and time information) associated with each captured media that includes an unknown time tag using the estimated time generated for each captured media in 710. In some implementations, the estimated time can be utilized to determine a time offset between the RTC time associated with each captured media and the generated estimated time, thereby enabling the temporal information associated with each captured media to be updated by the imaging device using the determined time offset.

Figure 8:
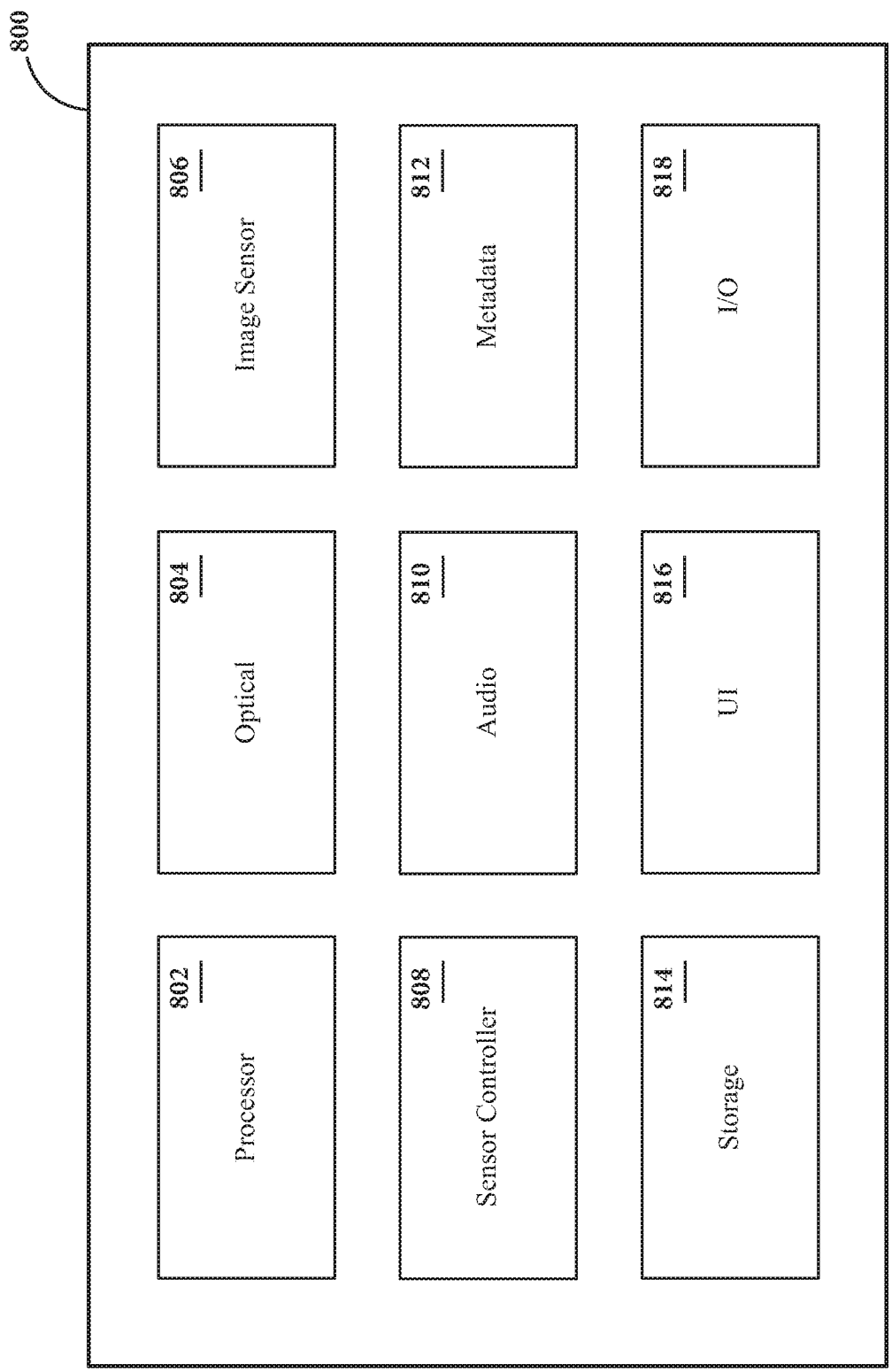
FIG. 8 is a functional block diagram illustrating electronic components of an example imaging device.

FIG. 8 is a functional block diagram illustrating electronic components of an example imaging device 800. The imaging device 800 of FIG. 8 may include a camera (i.e., an imaging device) configured to capture photo, video, and/or audio content. The imaging device 800 can comprise any of a variety of devices, including but not limited to action cameras, digital cameras, DSLR cameras, etc. The imaging device 800 may include one or more processors 802 (such as a system on a chip (SOC), microcontroller, microprocessor, CPU, DSP, ASIC, GPU, and/or other processors) that control the operation and functionality of the imaging device 800. The imaging device 800 can carry out a variety of techniques, including the techniques 100-700 of FIGS. 1-7, respectively.

The imaging device 800 may include one or more optical elements 804, such as one or more lenses. The one or more lenses may include, by way of non-limiting example, one or more of a standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, the optical elements 804 may implement focus controller functionality configured to control the operation and configuration of the one or more lenses.

The imaging device 800 may include an image sensor 806, such as one or more of a charge-coupled device (CCD) sensor, active pixel sensor (APS), complementary metal-oxide-semiconductor (CMOS) sensor, N-type metal-oxide-semiconductor (NMOS) sensor, and/or other image sensor. The imaging device 800 may include one or more image sensors. The image sensor 806 may be configured to capture light waves gathered by the optical elements 804 and to produce image data based on control signals from a sensor controller 808. The image sensor 806 may be configured to generate a first output signal conveying first visual information regarding the object. The visual information may include one or more of an image, a video, and/or other visual information. In some implementations, the image sensor 806 may include, without limitation, video, audio, capacitive, radio, vibrational, ultrasonic, infrared, radar, LIDAR and/or sonar, and/or other sensory devices. The optical elements 804 and the image sensor 806 may be embodied in a housing.

The imaging device 800 may include the aforementioned sensor controller 808. The sensor controller 808 may be used to operate the image sensor 806. The sensor controller 808 may receive image or video input from the image sensor 806 and audio information from one or more audio components 810, such as from microphones configured to provide audio information that may be associated with images being acquired by the image sensor 806 or voice-based commands being provided by the user. In some implementations, audio information may be encoded using, for example, AAC, AC3, MP3, linear PCM, MPEG-H, and/or other audio coding formats (audio codecs). In one or more implementations of spherical video and/or audio, the audio codec may include a 3-dimensional audio codec.

The imaging device 800 may include one or more metadata sources 812 embodied within a housing and/or disposed externally to the imaging device 800. The processor 802 may interface with the sensor controller 808 and/or the one or more metadata sources 812. The metadata sources 812 may include sensors, such as an inertial measurement unit (IMU) including one or more accelerometers and/or gyroscopes, a magnetometer, a compass, a global positioning system (GPS) sensor, an altimeter, an ambient light sensor, a temperature sensor, a pressure sensor, a heart rate sensor, and/or other sensors. The imaging device 800 may contain one or more other metadata/telemetry sources, for example, a battery monitor, storage parameters, and/or other information related to camera operation and/or capture of content. The metadata sources 812 may obtain information related to an environment of the imaging device 800 and aspects in which the content is captured.

For example, the accelerometer may provide device motion information comprising velocity and/or acceleration vectors representative of motion of the imaging device 800; the gyroscope may provide orientation information describing the orientation of the imaging device 800; the GPS sensor may provide GPS coordinates, time, and identifying location of the imaging device 800; and the altimeter may obtain the altitude of the imaging device 800. In some implementations, the metadata sources 812 may be rigidly coupled to the imaging device 800 such that any motion, orientation, or change in location experienced by the imaging device 800 is also experienced by the metadata sources 812.

The sensor controller 808 and/or the processor 802 may be operable to synchronize various types of information received from the metadata sources 812. For example, timing information may be associated with the sensor data. Using the timing information, metadata information may be related to content (photo/video) captured by the image sensor 806. In some implementations, the metadata capture may be decoupled from video/image capture. That is, metadata may be stored before, after, and in-between one or more video clips and/or images. In one or more implementations, the sensor controller 808 and/or the processor 802 may perform operations on the received metadata to generate additional metadata information. For example, the sensor controller 808 may integrate the received acceleration information to determine the velocity profile of the imaging device 800 during the recording of a video. In some implementations, video information may consist of multiple frames of pixels using any applicable encoding method (e.g., H.262, H.264, Cineform, and/or other codec).

The imaging device 800 may include an electronic storage 814. The electronic storage 814 can include a persistent memory, non-volatile memory, volatile memory, or any combination thereof. The electronic storage 814 may include a system memory module that is configured to store executable computer instructions that, when executed by the processor 802, perform various functionalities, including those described herein. The electronic storage 814 may include a storage memory configured to store content (e.g., metadata, images, audio) captured by the imaging device 800. The electronic storage 814 may also be located external to the imaging device 800.

The electronic storage 814 may include non-transitory memory configured to store configuration information and/or processing code configured to enable, for example, video information and metadata capture, and/or to produce a multimedia stream comprised of, for example, a video track and metadata in accordance with the methodologies of the present disclosure. In one or more implementations, the processing configuration may include capture type (e.g., video, still images), image resolution, frame rate, burst setting, white balance, recording configuration (e.g., loop mode), audio track configuration, and/or other parameters that may be associated with audio, video, and/or metadata capture. Additional memory may be available for other hardware/firmware/software needs of the imaging device 800. The processor 802 may interface with the sensor controller 808 in order to obtain and process sensory information for, for example, object detection, face tracking, stereo vision, and/or other tasks.

The imaging device 800 may interface with a user interface (UI) device 816. The UI device 816 may include virtually any type of device capable of registering inputs from and/or communicating outputs to the user. These may include, without limitation, display, touch, proximity sensitive interface, light, sound receiving/emitting devices, wired/wireless input devices, and/or other devices. In some implementations, the UI device 816 may correspond to an external device, including but not limited to a smartphone, a tablet computer, a phablet, a smart watch, a portable computer, and/or another device configured to receive user input and communicate information with the imaging device 800.

In some implementations, the imaging device 800 may be configured to provide image or video content (or a portion thereof) to the UI device 816 for processing and/or viewing. The image or video content (or a portion thereof) can be provided by the imaging device 800 to the UI device 816 via wired or wireless data transfer (e.g., Bluetooth, Wi-Fi, NFC, cellular, etc.). The wired data transfer of content between the imaging device 800 and the external device can be established using a USB or micro-USB cable (or a similar connection device) that is connected between the imaging device 800 and a corresponding I/O module of the external device.

The imaging device 800 can wirelessly transfer content captured by the imaging device 800 to an external device, including but not limited to a smartphone, or to a cloud-based device, including but not limited to a cloud-based system and accompanying service. The wireless data transfer can be seamless and automated, requiring no intervening user activity. For example, the transfer of content from the imaging device 800 to the external device can be automated based on a variety of factors, including but not limited to predetermined time periods (e.g., automatically transfer content every hour), reaching predetermined wireless connectivity threshold levels (e.g., always automatically transfer content when connected to Wi-Fi but obtain user approval before transferring content when connected to cellular), detected location of the external device (e.g., always wireless transfer when the external device is within 5 feet of the imaging device 800), and machine learning (e.g., using neural networks) detection of certain situations or moments that warrant wireless data transfer (e.g., while the imaging device 800 is being charged, the user previously selected to have data be automatically transferred to his/her external device, such that future charging moments will initiate automatic data transfer, etc.).

In addition, the wireless data transfer of content between the imaging device 800 and an external device (e.g., a smartphone) can be activated by an intervening user activity, including but not limited to the user selecting a control interface (e.g., a button on the imaging device 800), the user providing an audio command (e.g., "GoPro transfer my content to my smartphone") received by a sensor of the imaging device 800, the user providing a gesture (e.g., giving a thumbs-up sign) received by a sensor of the imaging device 800, and the user viewing at least a portion of the external device within the field-of-view (FOV) of the imaging device 800 to provide information associated with the external device that is received by the image sensor 806 and processed by the processor 802 to initiate the wireless data transfer (e.g., the user uses the imaging device 800 to view the external device, which produces data/information, such as an image of the external device, and, based on a recognition of the external device using the data/information, the wireless data transfer is automatically initiated).

The UI device 816 may operate a software application configured to perform a variety of operations related to camera configuration, control of video acquisition, image processing, and/or display of video captured by the imaging device 800. An application (e.g., GoPro App) may enable the user to create short video clips and share video clips to a cloud service (e.g., Instagram, Facebook, YouTube, Dropbox); perform full remote control of functions of the imaging device 800; live preview video being captured for shot framing; mark key moments while recording (e.g., HiLight Tag); View HiLight Tags in GoPro Camera Roll for location and/or playback of video highlights; wirelessly control camera software; and/or perform other functions. Various methodologies may be utilized for configuring the imaging device 800 and/or processing or displaying the captured information from the imaging device 800. Creating short clips, sharing content, uploading to a cloud service, marking key moments while recording, and/or other camera functions may be controlled using any of the UI functionalities described.

To illustrate, the UI device 816 may receive a user setting characterizing image resolution (e.g., 3840 pixels by 2160 pixels), frame rate (e.g., 60 frames per second (fps)), and/or other settings (e.g., location) related to the activity (e.g., mountain biking) being captured by the user with the imaging device 800. The UI device 816 may then communicate these settings to the imaging device 800.

A display or display unit (not shown) of the UI device 816 may act as a viewport into content captured by the imaging device 800. The display unit can include a variety of displays, including but not limited to an LCD display and an LED display. In some implementations, the UI device 816 may communicate additional information (e.g., metadata) to the imaging device 800. For example, the UI device 816 may provide orientation of the UI device 816 with respect to a given coordinate system to the imaging device 800 so as to enable determination of an orientation and/or dimensions for viewing a portion of the captured content provided by the imaging device 800.

The display associated with the UI device 816 may be configured to provide information related to camera operation mode (e.g., image resolution, frame rate, capture mode, sensor mode, video mode, photo mode), connection status (e.g., connected, wireless, wired connection), power mode (e.g., standby, sensor mode, video mode, battery status), information related to metadata sources (e.g., heart rate, GPS), and/or other information.

The UI device 816 may also include one or more UI interface components configured to enable the user to start, stop, pause, and/or resume sensor and/or content capture. User commands may be encoded using a variety of approaches, including a duration of button press (pulse width modulation), a number of button presses (pulse code modulation), and/or a combination thereof. For example, two short button presses may initiate sensor acquisition mode, and a single short button press may be used to communicate (i) initiation of video and/or photo capture and cessation of video and/or photo capture (e.g., toggle mode) or (ii) video and/or photo capture for a given time duration or number of frames (e.g., burst capture). Other user command or communication implementations may also be realized, for example, short/long button press combinations.

The imaging device 800 may include the I/O module 818. The I/O module 818 may be configured to synchronize the imaging device 800 with other cameras and/or with other external devices, such as a remote control, a second capture device, a smartphone, and/or a video server. The I/O module 818 may be configured to communicate information to/from various I/O components. In some implementations, the I/O module 818 may include a wired and/or wireless communications interface (e.g., Wi-Fi, Bluetooth, USB, HDMI, Wireless USB, Near Field Communication (NFC), Ethernet, a radio frequency transceiver, and/or other interfaces) configured to communicate with one or more external devices (e.g., UI device 816 comprising a smartphone and/or another metadata source). In some implementations, the I/O module 818 may interface with LED lights, a display, a button, a microphone, speakers, and/or other I/O components. In one or more implementations, the I/O module 818 may interface with an energy source, for example, a battery and/or a DC electrical source.

The I/O module 818 of the imaging device 800 may include one or more connections to external computerized devices to allow for configuration and/or management of either the imaging device 800 or various remote devices. The I/O module 818 may include any of the wireless or wireline interfaces discussed above, and, further, may include customized or proprietary connections for specific applications. In some implementations, the I/O module 818 may include a component (e.g., a dongle) comprising an infrared sensor, a radio frequency antenna, an ultrasonic transducer, and/or other communications interfaces. In one or more implementations, the I/O module 818 may include a local (e.g., Bluetooth, Wi-Fi) and/or broad range (e.g., cellular LTE) communications interface configured to enable communications between the imaging device 800 and a remote device, such as the UI device 816 described above.

The imaging device 800 may include a power system (not shown) that may be tailored to the needs of the imaging device 800. For example, a small-sized, lower-power action camera may include a wireless power solution, a removable/replaceable battery, a solar cell, an inductive (contactless) power source, rectification, and/or other power supplies.

Figure 9:
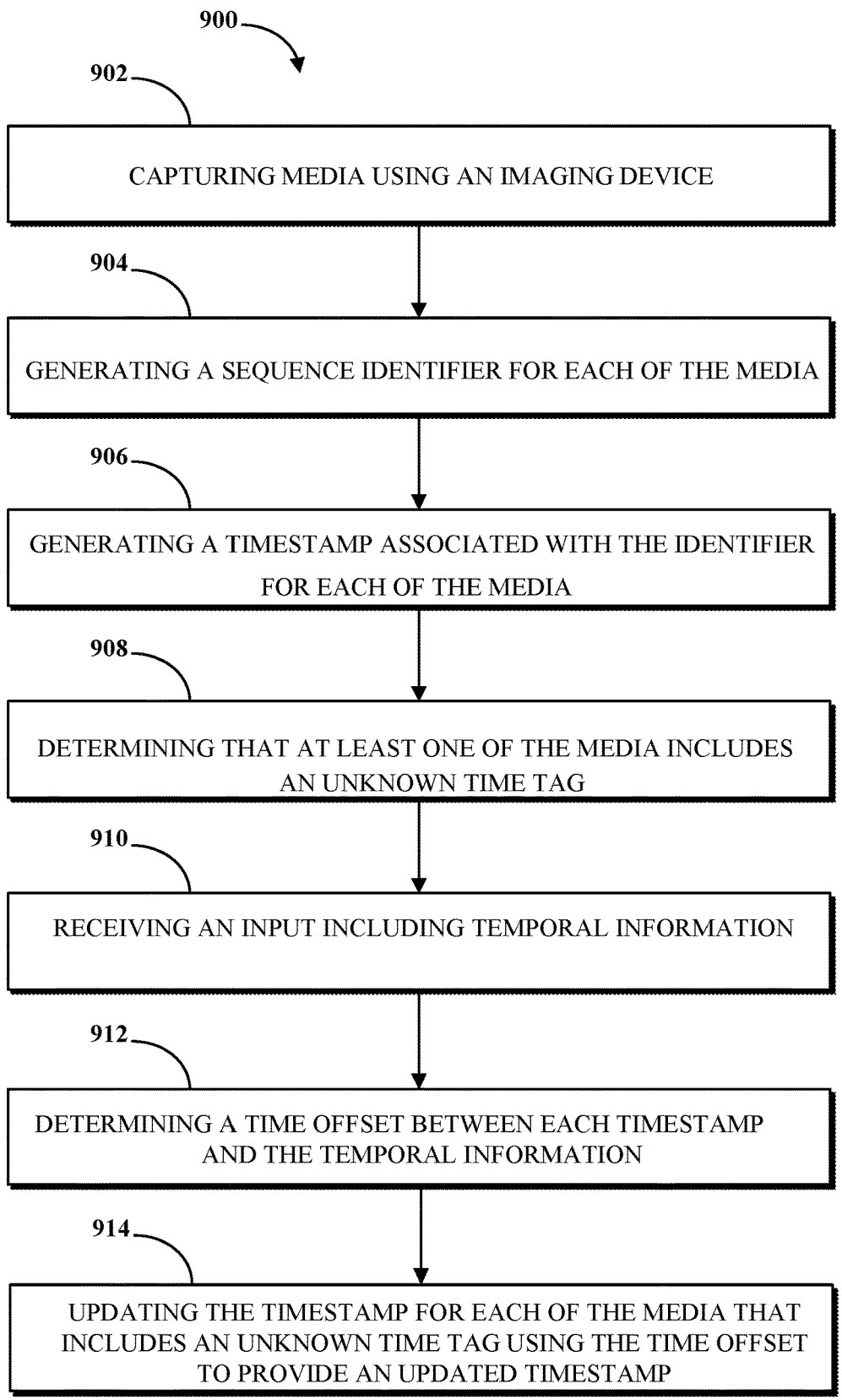
FIG. 9 is a flowchart illustrating an example of a technique of an imaging device for providing temporal information synchronization.

FIG. 9 is a flowchart illustrating an example of a technique 900 of an imaging device for providing temporal information synchronization. The technique 900 describes operations performed in connection with the updating or other use of temporal information, including, but not limited to, in situations in which temporal information for captured media is incorrect. An imaging device that carries out the technique 900 can be any of a variety of imaging devices, including but not limited to action cameras and digital cameras. The imaging device 800 of FIG. 8 can carry out the technique 900. The imaging device can include any of a persistent memory, non-volatile memory, removable memory, removable battery, and non-removable battery. In some implementations, the imaging device includes a persistent memory and a non-removable battery. The technique 900 illustrates an imaging device performing temporal information synchronization on captured media.

The technique 900 comprises capturing a plurality of media (i.e., capturing media) using an imaging device via 902, generating a sequence identifier for each of the media (i.e., each of the plurality of media) via 904, generating a timestamp associated with the sequence identifier for each of the media via 906, determining that at least one of the media includes an unknown time tag via 908, receiving an input including temporal information via 910, determining a time offset between each timestamp and the temporal information via 912, and updating the timestamp for each of the media that includes an unknown time tag (i.e., corresponding to each of the at least one of the media) using the time offset to provide an updated timestamp via 914. By updating the previously generated timestamp associated with each of the media that includes an unknown time tag using the time offset determined from the input including temporal information, the technique 900 provides for temporal information synchronization.

In some implementations, the imaging device includes at least one of a persistent memory, non-volatile memory, or a combination thereof. Generating the timestamp for each of the media via 906 can comprise generating the timestamp for each of the media using a RTC or similar internal clock of the imaging device. Determining that the at least one of the media includes the unknown time tag via 908 can comprise detecting that the imaging device has reached a battery drain cycle threshold and applying the unknown time tag to each of the media captured after the detecting that the imaging device has reached the battery drain cycle threshold. Therefore, once the imaging device has experienced a battery depletion event, media that is captured by the imaging device from that point forward can be flagged with an unknown time tag. The sequence identifier of the last media captured before the detecting that the imaging device has reached the battery drain cycle threshold can be recorded so that the unknown time tag can be applied starting with the media with the next sequence identifier that follows (e.g., the sequence identifier ID23 that follows the sequence identifier ID22 corresponding to the last media captured before the battery drain cycle threshold was reached) and the subsequently captured media.

In some implementations, the technique 900 further comprises generating a battery drain cycle identifier for each of the media captured before the detecting that the imaging device has reached the battery drain cycle threshold. The battery drain cycle identifier can be used to determine which sets of captured media will receive the temporal information synchronization (i.e., temporal information synchronization can be limited to certain media specified with certain battery drain cycle identifiers). In some implementations, receiving the input including the temporal information via 910 can comprise providing a notification request to a user of the imaging device via an input interface of the imaging device and receiving a user input indicative of the user interacting with the input interface, the user input including the temporal information. In some implementations, receiving the input including the temporal information via 910 can comprise establishing a connection with an electronic device, the electronic device being connected to a network enabling generation of the temporal information that is daylight corrected and time zone corrected and receiving an automated input of the temporal information from the electronic device. In some implementations, user inputted temporal information and electronic device communication temporal information can both be received by the imaging device and utilized to perform the temporal information synchronization.

In some implementations, a system is provided to perform the technique 900 of FIG. 9. The system can comprise a processor and a memory. The memory can include at least one of a persistent memory, non-volatile memory, or a combination thereof, and can further include instructions that, when executed, cause the processor to perform the technique 900. In some implementations, a non-transitory computer-readable storage medium is provided to perform the technique 900 of FIG. 9. The non-transitory computer-readable storage medium can include instructions that, when executed, cause at least one processor to capture a plurality of media using an imaging device; generate an identifier for each of the plurality of media, each identifier including a sequentially ordered code (e.g., X1, X2, X3, etc.); generate a timestamp for each of the plurality of media; detect battery discharge information associated with the imaging device; determine that at least one of the plurality of media includes an unknown time tag using the battery discharge information; receive an input including temporal information; determine a time offset between each timestamp and the temporal information; and update the timestamp corresponding to each of the at least one of the plurality of media using the time offset to provide an updated timestamp.

In some implementations, the imaging device (e.g., the imaging device 800 of FIG. 8) can perform temporal information synchronization on captured media that each include a unique sequence identifier by acquiring the correct time either via a manual process (e.g., the techniques 200 and 600 of FIGS. 2 and 6, respectively) or via an automated process (e.g., the techniques 100 and 500 of FIGS. 1 and 5, respectively), determining a time offset for at least some or all of the captured media as a differential between the correct time acquired and a wrong time (i.e., media flagged with an unknown time tag, thereby denoting wrong or incorrect temporal information) currently associated with the captured media, and updating the wrong time with the correct time retroactively for a given battery drain cycle using a corresponding battery drain cycle identifier and battery drain cycle frequency information.

In some implementations, the imaging device (e.g., the imaging device 800 of FIG. 8) that carries out any of the techniques 100-700 and 900 (i.e., of FIGS. 1-7 and FIG. 9, respectively) can include non-integrated memory (e.g., removable media) and can perform temporal information synchronization on captured media by tagging the captured media with a global unique media identifier (GUMI) and a unique sequence identifier, storing the latest sequence identifier in the imaging device's persistent memory or storage, tagging the captured media with an unknown time tag and a battery drain cycle identifier corresponding to a battery depletion event, detecting that some of the captured media includes an unknown time tag, receiving temporal information from an external source (e.g., a smartphone or user submission) with the received temporal information corresponding to correct temporal information, determining a time offset between temporal information associated with the captured media that includes an unknown time tag, and correcting the temporal information associated with the captured media that includes an unknown time tag using the determined time offset to output updated temporal information that is associated with the captured media that previously included an unknown time tag (e.g., once the temporal information is updated, the unknown time tag can be removed).

The word "example" is used herein to mean serving as an example, instance, or illustration. An aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any natural inclusive permutation thereof. That is, if X includes A; X includes B; or X includes both A and B, then "X includes A or B" is satisfied under one or more of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

As used herein, the term "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

Implementations of the clients and servers described herein (and the functionality thereof) can be realized in hardware, software, or a combination thereof. The hardware can include, for example, computers, memory, intellectual property (IP) cores, ASICs, programmable logic arrays, optical processors, programmable logic controllers, microcode, microcontrollers, servers, microprocessors, digital signal processors, or another suitable circuit. In the claims, the term "processor" should be understood as encompassing one or more of the foregoing hardware, either singly or in combination. The terms "signal" and "data" are used interchangeably. Further, portions of the clients and servers do not necessarily have to be implemented in the same manner.

Further, in one aspect, the clients or the servers described herein can be implemented using a general-purpose computer or general-purpose processor with a computer program that, when executed, carries out one or more of the respective techniques, methods, algorithms, and/or instructions described herein. In addition, or alternatively, for example, a special-purpose computer/processor, which can contain other hardware for carrying out one or more of the techniques, methods, algorithms, or instructions described herein, can be utilized.

Further, all or a portion of implementations of the present disclosure can take the form of a computer program product accessible from, for example, a computer-usable or computer-readable medium. A computer-usable or computer-readable medium can be a device that can, for example, tangibly contain, store, communicate, or transport the program for use by or in connection with a processor. The medium can be, for example, an electronic, magnetic, optical, electromagnetic, or semiconductor device. Other suitable mediums are also available.

The above-described implementations and examples have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
    capturing media using an imaging device;
    generating a sequence identifier for each of the media;
    generating a timestamp associated with the sequence identifier for each of the media;
    determining that at least one of the media includes an unknown time tag;
    receiving an input including temporal information;
    determining a time offset between each timestamp and the temporal information; and
    updating the timestamp for each of the media that includes an unknown time tag using the time offset to provide an updated timestamp.

2. The method of claim 1, wherein the imaging device includes at least one of a persistent memory, non-volatile memory, or a combination thereof.

3. The method of claim 1, wherein the generating the timestamp for each of the media comprises:
    generating the timestamp for each of the media using a real time clock of the imaging device.

4. The method of claim 1, wherein the determining that the at least one of the media includes the unknown time tag comprises:
    detecting that the imaging device has reached a battery drain cycle threshold; and
    applying the unknown time tag to each of the media captured after the detecting that the imaging device has reached the battery drain cycle threshold.

5. The method of claim 4, further comprising:
    generating a battery drain cycle identifier for each of the media captured before the detecting that the imaging device has reached the battery drain cycle threshold.

6. The method of claim 1, wherein the receiving the input including the temporal information comprises:
    providing a notification request to a user of the imaging device via an input interface of the imaging device; and
    receiving a user input indicative of the user interacting with the input interface, the user input including the temporal information.

7. The method of claim 1, wherein the receiving the input including the temporal information comprises:
    establishing a connection with an electronic device, the electronic device being connected to a network enabling generation of the temporal information that is daylight corrected and time zone corrected; and
    receiving an automated input of the temporal information from the electronic device.

8. A system, comprising:
    a processor; and
    a memory, the memory including at least one of a persistent memory, non-volatile memory, or a combination thereof, the memory including instructions that, when executed, cause the processor to:
    capture media;
    generate a timestamp for each of the media;
    determine that at least one of the media includes an unknown time tag;
    receive an input including temporal information;

determine a time offset between each timestamp and the temporal information; and update the timestamp for each of the media that includes an unknown time tag using the time offset to provide an updated timestamp.

9. The system of claim 8, further comprising:
a real time clock that generates the timestamp for each of the media.

10. The system of claim 8, wherein to determine that the at least one of the media includes the unknown time tag comprises:
detecting that the system has reached a battery drain cycle threshold; and applying the unknown time tag to each of the media captured after detecting that the system has reached the battery drain cycle threshold.

11. The system of claim 10, the memory further including instructions that, when executed, cause the processor to:
generate a battery drain cycle identifier for each of the media captured before the detecting that the system has reached the battery drain cycle threshold.

12. The system of claim 8, further comprising:
an input interface, wherein to receive the input including the temporal information comprises:
providing a notification request to a user of the system via the input interface; and
receiving a user input indicative of the user interacting with the input interface, the user input including the temporal information.

13. The system of claim 8, wherein to receive the input including the temporal information comprises:
establishing a connection with an electronic device, the electronic device being connected to a network enabling generation of the temporal information that is daylight corrected and time zone corrected; and
receiving an automated input of the temporal information from the electronic device.

14. A non-transitory computer-readable storage medium including instructions that, when executed, cause at least one processor to:
capture media using an imaging device;
generate an identifier for each of the media, each identifier including a sequentially ordered code;
generate a timestamp associated with the identifier for each of the media;
detect battery discharge information associated with the imaging device;
determine that at least one of the media includes an unknown time tag using the battery discharge information;

receive an input including temporal information;
determine a time offset between each timestamp and the temporal information; and
update the timestamp for each of the media that includes an unknown time tag using the time offset to provide an updated timestamp.

15. The non-transitory computer-readable storage medium of claim 14, wherein the imaging device includes at least one of a persistent memory, non-volatile memory, or a combination thereof.

16. The non-transitory computer-readable storage medium of claim 14, wherein to generate the timestamp for each of the media comprises:
generating the timestamp for each of the media using a real time clock of the imaging device.

17. The non-transitory computer-readable storage medium of claim 14, wherein to determine that the at least one of the media includes the unknown time tag using the battery discharge information comprises:
detecting that the imaging device has reached a battery drain cycle threshold using the battery discharge information; and
applying the unknown time tag to each of the media captured after detecting that the imaging device has reached the battery drain cycle threshold.

18. The non-transitory computer-readable storage medium of claim 17, further including instructions that, when executed, cause the at least one processor to:
generate a battery drain cycle identifier for each of the media captured before the detecting that the imaging device has reached the battery drain cycle threshold.

19. The non-transitory computer-readable storage medium of claim 14, wherein to receive the input including the temporal information comprises:
providing a notification request to a user of the imaging device via an input interface of the imaging device; and
receiving a user input indicative of the user interacting with the input interface, the user input including the temporal information.

20. The non-transitory computer-readable storage medium of claim 14, wherein to receive the input including the temporal information comprises:
establishing a connection with an electronic device, the electronic device being connected to a network enabling generation of the temporal information that is daylight corrected and time zone corrected; and
receiving an automated input of the temporal information from the electronic device.

* * * * *